(No Model.)
C. J. BROWN.
CLOTHES LINE FASTENER.
No. 529,703. Patented Nov. 27, 1894.
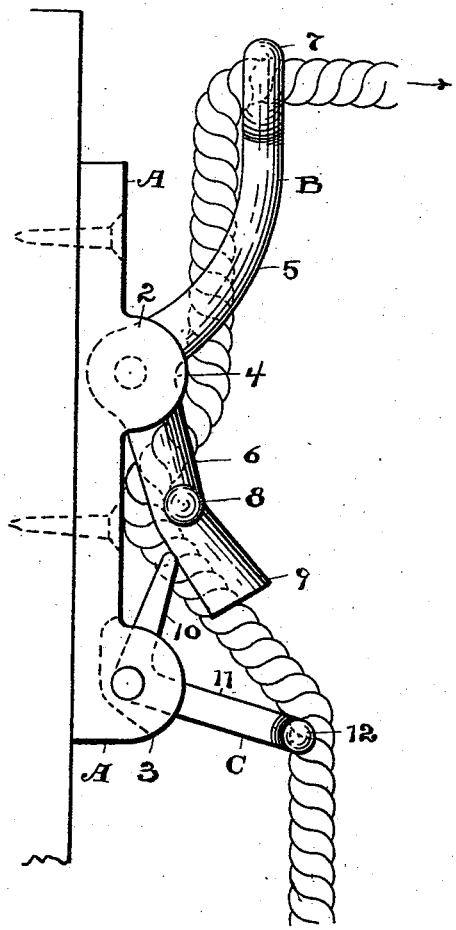
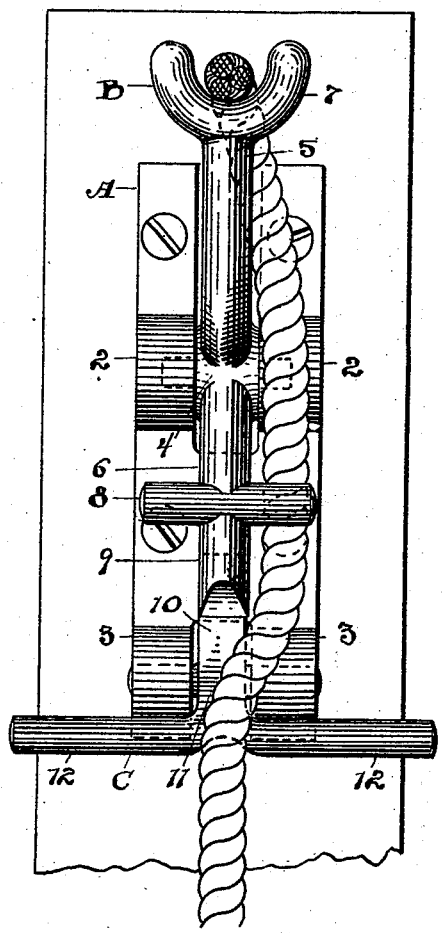
ATTEST.
F. B. Moser
G. S. Scharff
INVENTOR.
Charles J. Brown
BY H. J. Fisher ATTORNEY.

UNITED STATES PATENT OFFICE.

CHARLES J. BROWN, OF CLEVELAND, OHIO.

CLOTHES-LINE FASTENER.

SPECIFICATION forming part of Letters Patent No. 529,703, dated November 27, 1894.

Application filed September 1, 1894. Serial No. 521,912. (No model.)

*To all whom it may concern:*

Be it known that I, CHARLES J. BROWN, a citizen of the United States, residing at Cleveland, in the county of Cuyahoga and State of Ohio, have invented certain new and useful Improvements in Clothes-Line Holders; and I do hereby declare that the following is a full, clear, and exact description of the invention, which will enable others skilled in the art to which it appertains to make and use the same.

My invention relates to improvements in clothes-line holders, and the invention consists in a clothes-line holder having a pivoted arm for the line to engage over at one end and lateral projections to engage the free end of the line at the other end, and a separate pivoted member to operate in connection with said lever, all substantially as shown and described and particularly pointed out in the claims.

In the accompanying drawings, Figure 1 is a side elevation of my improved clothes-line holder, showing the parts as they appear when the line is stretched and locked in the holder. Fig. 2 is a front elevation of the holder with the parts in position and operating as in Fig. 1.

The holder shown in the drawings consists of three separate parts, comprising the bracket or base A, the holder arm B and the lever C. The bracket A is constructed to be affixed to a post, the side of a building or the like, and has ears —2— and —3—, respectively, in pairs projecting from its face in which the arm B and the lever C are pivoted. The arm B is of peculiar construction as is plainly seen in the drawings, and is adapted to hold the line by a friction grip as will now appear. Thus, the elbow —4— of the arm is its lowest point and it is here that it engages in the ears —2— and is pivoted to turn within certain limits. From this elbow the upper and longer portion —5— and the lower and shorter portion —6— both alike project outward at about the same angle, and the upper portion has a forked or divided extremity —7— over which the line extends and is held, the pull of course being outward in the direction of the arrow. The lower and shorter portion —6— has two lateral and oppositely arranged projections —8— nearly or about midway its length and the free end of the clothes line or rope is adapted to be engaged and held by and under either one of the said projections —8—. Below these is a still further projection —9— of the lower arm as and for the purpose hereinafter described. Assuming, for example, that the line is engaged over the fork —7— and the free end is pulled upon until the line is thoroughly stretched, it will of course follow that the short arm —6— will be pressed against the bracket. Then by engaging the free end of the line under either of said lateral projections —8— the backward pressure on the short arm will come on the line instead of the arm itself, as seen in Fig. 1, and the line will thus be gripped and held. The tighter the stretch of the line the tighter the grip on the line at —8—. This is obvious; but it is also obvious that it would be no easy thing to get the line under projection —8— when the line is stretched, and that it would be difficult to stretch the line with the free end thereof under the projection —8—. In either case the holder arm B would be difficult of operation alone. I have therefore provided the lever C to operate therewith and render the operation easy and satisfactory. This lever is in the shape of a bell crank as seen in edge view Fig. 1, and has a tongue —10— which projects under the extension or extremity —9— of the holder arm B and a free outer end —11— with lateral projections —12— and a depression at the middle in which the free end of the line ordinarily rests. Now, having this additional member the operation of the line holder is made complete and easy of use. Assuming that the parts are as seen in the drawings and it be desired to stretch the line, it is only necessary to pull down on the line by gripping it below lever C and then the lower end of holder arm B will be pressed outward and the line will be sufficiently released to be drawn upon the same as if there were no intervening gripping or holding mechanism. As the pull is let up the parts will go back again to holding position; or if the line is to be released it need only be pulled down at the free end with a moderate tension and at the same time carried out to one side so as to disengage from under projection —8— and then it will be perfectly free. Indeed, the lever C gives perfect and easy control of the holder. The lateral projections —12— are serviceable as bearings for the line when it is carried laterally to release from projections —8— because the line is caused to press down on the projections —12— at the same time that the release occurs at —8—. The part B might be made with one projection —8—, but for convenience two are provided.

What I claim is—

1. The holder arm having a forked top end and a lateral projection on its lower end and pivoted near its center, in combination with an operating lever pivoted to engage beneath the lower end of the said arm and having a lateral projection at its free end to serve as a bearing for the line when it is released, substantially as set forth.

2. In clothes line holders, a bracket, a holder arm pivoted at about its middle to the bracket and having its top end constructed to engage the line and a lateral projection near its lower end to engage over the free end of the line, in combination with a lever pivoted on said bracket beneath said arm and having a tongue at substantially right angles to its free end and bearing against the lower extremity of said arm below the lateral projection thereon and a lateral projection on said lever corresponding to the lateral projection on said arm, substantially as set forth.

Witness my hand to the foregoing specification this 22d day of August, 1894.

CHARLES J. BROWN.

Witnesses:
H. T. FISHER,
R. B. MOSER.